US011595487B2

(12) United States Patent
Besehanic

(10) Patent No.: US 11,595,487 B2
(45) Date of Patent: Feb. 28, 2023

(54) SYSTEMS, METHODS, AND APPARATUS TO IDENTIFY MEDIA PRESENTATION DEVICES

(71) Applicant: THE NIELSEN COMPANY (US), LLC, New York, NY (US)

(72) Inventor: Jan Besehanic, Tampa, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 467 days.

(21) Appl. No.: 15/943,393

(22) Filed: Apr. 2, 2018

(65) Prior Publication Data

US 2018/0227374 A1 Aug. 9, 2018

Related U.S. Application Data

(63) Continuation of application No. 15/299,766, filed on Oct. 21, 2016, now Pat. No. 9,936,033, which is a continuation of application No. 15/084,929, filed on Mar. 30, 2016, now Pat. No. 9,491,250, which is a
(Continued)

(51) Int. Cl.
*H04L 67/50* (2022.01)
*H04L 61/5007* (2022.01)
*H04L 61/5014* (2022.01)
*H04L 61/4511* (2022.01)
*H04L 61/2514* (2022.01)
*H04L 61/5076* (2022.01)

(52) U.S. Cl.
CPC ........ *H04L 67/535* (2022.05); *H04L 61/2514* (2013.01); *H04L 61/4511* (2022.05); *H04L 61/5007* (2022.05); *H04L 61/5014* (2022.05); *H04L 61/5076* (2022.05)

(58) Field of Classification Search
CPC ...................................................... H04L 67/22
See application file for complete search history.

(56) References Cited

U.S. PATENT DOCUMENTS

| 6,728,767 B1 | 4/2004 | Day et al. |
| 7,606,897 B2 | 10/2009 | Izrailevsky et al. |
| 7,756,984 B2 | 7/2010 | Burr et al. |

(Continued)

OTHER PUBLICATIONS

United States Patent and Trademark Office, "Notice of Allowance," issued in connection with U.S. Appl. No. 15/084,929, dated Jul. 11, 2016, 14 pages.
United States Patent and Trademark Office, "Final Office Action," issued in connection with U.S. Appl. No. 13/329,044, dated Aug. 13, 2015, 17 pages.
United States Patent and Trademark Office, "Non-Final Office Action," issued in connection with U.S. Appl. No. 13/329,044, dated Jan. 5, 2015, 14 pages.

(Continued)

*Primary Examiner* — Suraj M Joshi
(74) *Attorney, Agent, or Firm* — Hanley, Flight & Zimmerman, LLC

(57) ABSTRACT

Systems, methods, and apparatus to identify media presentation devices are disclosed. An example method includes associating a domain name service query received at a pseudo DNS server with a media exposure measurement location based on a public Internet Protocol address of the received domain name service query, wherein the pseudo DNS server does not provide domain name-to-IP address translation, and wherein the pseudo DNS server is to receive the domain name service query and transmit a redirect message identifying a conventional DNS server. The example method further includes crediting the media exposure measurement location with accessing media identified based on the domain name service query.

28 Claims, 7 Drawing Sheets

Related U.S. Application Data continuation of application No. 13/329,044, filed on Dec. 16, 2011, now Pat. No. 9,331,975.

(56) References Cited

U.S. PATENT DOCUMENTS

| | | | |
|---|---|---|---|
| 7,853,721 | B2 | 12/2010 | Awadallah et al. |
| 9,331,975 | B2 | 5/2016 | Besehanic |
| 9,491,250 | B2 | 11/2016 | Besehanic |
| 2005/0083883 | A1 | 4/2005 | Ho et al. |
| 2007/0067419 | A1 | 3/2007 | Bennett |
| 2007/0291739 | A1* | 12/2007 | Sullivan .............. G06Q 30/02 370/352 |
| 2007/0294419 | A1 | 12/2007 | Ulevitch |
| 2010/0121954 | A1 | 5/2010 | Yang et al. |
| 2010/0191577 | A1* | 7/2010 | Lu .................... G06Q 30/02 705/7.32 |
| 2011/0055349 | A1 | 3/2011 | Awadallah et al. |
| 2011/0145211 | A1* | 6/2011 | Gerber ............... H04L 41/5038 707/705 |
| 2012/0254996 | A1 | 10/2012 | Wilbourn et al. |
| 2013/0159499 | A1 | 6/2013 | Besehanic |
| 2016/0212233 | A1 | 7/2016 | Besehanic |

OTHER PUBLICATIONS

United States Patent and Trademark Office, "Notice of Allowance," issued in connection with U.S. Appl. No. 13/329,044, dated Dec. 21, 2015, 11 pages.

Computer Performance Ltd., "Debug Logging for DNS in Windows Server 2003," retrieved from <http://web.archive.org/web/20071013132927/www.computerperformance.co.uk/w2k3/services/DNS_debug_logging.htm>, retrieved on Feb. 15, 2011, 3 pages.

Yellowhead.com, "DNS Monitor," retrieved from <http://www.yellowhead.com/DNS_Monitor.html>, retrieved on Feb. 15, 2011, 7 pages.

Stanek, "Managing DNS Server Configuration and Security," Microsoft Windows 2000 Administrator's Pocket Consultant, Microsoft, 2011, retrieved from https://docs.microsoft.com/en-US/previous-versions/windows/it-pro/windows-server-2000/bb727020(v=technet.10), on Jan. 12, 2011, 6 pages.

OpenDNS, "OpenDNS > Solutions > Overview," 2011, retrieved on Jan. 12, 2011, 3 pages.

United States Patent and Trademark Office, "Notice of Allowance," issued in connection with U.S. Appl. No. 15/299,766, dated Dec. 13, 2017, 5 pages.

United States Patent and Trademark Office, "Non-Final Office Action," issued in connection with U.S. Appl. No. 15/299,766, dated Sep. 8, 2017, 5 pages.

* cited by examiner

300

| PANELIST | MEDIA PRESENTATION DEVICE | QUERY PROCESSOR | |
|---|---|---|---|
| 305 — PANELIST 1 (PUBLIC IP = 209.173.241.209) | INTERNET TELEVISION 320 | IP ADDRESS 1 | — 322 |
| 305 — PANELIST 1 (PUBLIC IP = 209.173.241.209) | PERSONAL COMPUTER 325 | IP ADDRESS 2 | — 327 |
| 305 — PANELIST 1 (PUBLIC IP = 209.173.241.209) | GAMING CONSOLE 330 | IP ADDRESS 3 | — 332 |
| 305 — PANELIST 1 (PUBLIC IP = 209.173.241.209) | TABLET COMPUTER 335 | IP ADDRESS 4 | — 337 |
| 310 — PANELIST 2 (PUBLIC IP = 138.108.20.122) | DIGITAL MEDIA PLAYER 350 | IP ADDRESS 1 | — 322 |

FIG. 3

SYSTEMS, METHODS, AND APPARATUS TO IDENTIFY MEDIA PRESENTATION DEVICES

CROSS REFERENCES TO RELATED APPLICATION

This patent arises from a continuation of U.S. patent application Ser. No. 15/299,766, filed Oct. 21, 2016, entitled "SYSTEMS, METHODS, AND APPARATUS TO IDENTIFY MEDIA PRESENTATION DEVICES," now U.S. Pat. No. 9,936,033, which arises from a continuation of U.S. patent application Ser. No. 15/084,929, filed Mar. 30, 2016, entitled "SYSTEMS, METHODS AND APPARATUS TO IDENTIFY MEDIA PRESENTATION DEVICES," now U.S. Pat. No. 9,491,250, which arises from a continuation of U.S. patent application Ser. No. 13/329,044, filed Dec. 16, 2011, entitled "SYSTEMS, METHODS AND APPARATUS TO IDENTIFY MEDIA PRESENTATION DEVICES," now U.S. Pat. No. 9,331,975. U.S. patent application Ser. No. 13/329,044, U.S. patent application Ser. No. 15/084,929, and U.S. patent application Ser. No. 15/299,766 are hereby incorporated by reference in their entirety.

FIELD OF THE DISCLOSURE

This disclosure relates generally to monitoring network activity, and, more particularly, to systems, methods, and apparatus to identify media presentation devices.

BACKGROUND

Media content providers and/or metering entities such as, for example, advertising companies, broadcast networks, etc. are often interested in the viewing, listening, and/or media behavior interests of audience members and/or the public in general. To collect these behavior interests, an audience measurement company may enlist panelists (e.g., persons agreeing to have their media exposure habits monitored) to cooperate in an audience measurement study. The viewing habits of these panelists as well as demographic data about the panelists is collected and used to statistically determine (e.g., project, estimate, etc.) the size and demographics of a larger viewing audience.

In recent years, increasing numbers of consumer devices have been provided with Internet connectivity and the ability to retrieve media content from the Internet.

BRIEF DESCRIPTION OF THE DRAWINGS

FIG. 3 is a table showing an example association of the media presentation devices shown in FIG. 1 with each domain name service (DNS) query processor shown in FIG. 1.

DETAILED DESCRIPTION

Figure 1:
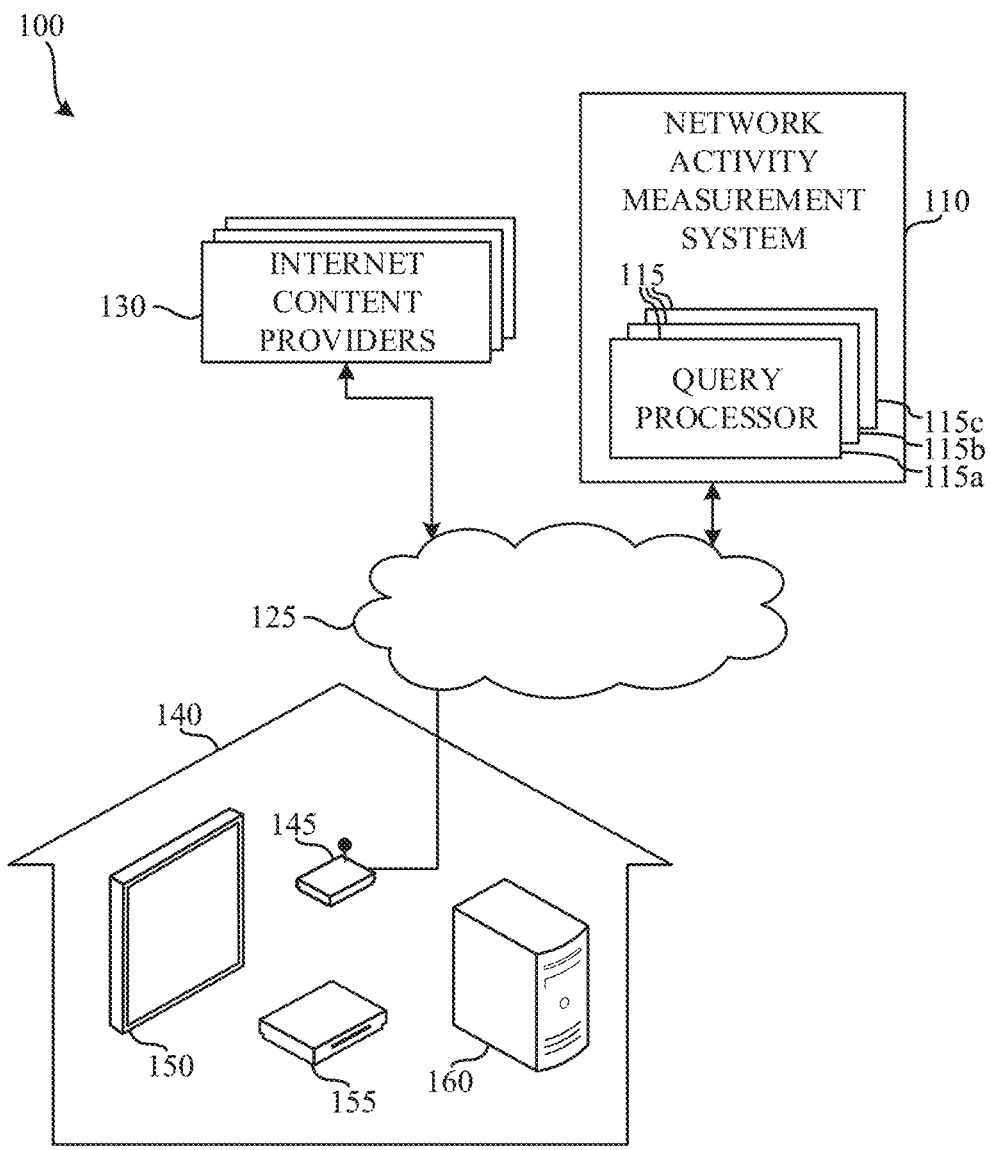
FIG. 1 is a block diagram of an example system to identify media presentation devices accessing Internet content.

As used herein, the term "media" includes any type of content, such as television, radio, advertisements, movies, web sites, etc. Example methods, apparatus, and articles of manufacture disclosed herein identify media presentation devices and/or types of media presentation devices used for media measurement. Such media presentation devices may include, for example, Internet-enabled televisions, personal computers, Internet-enabled mobile handsets (e.g., a smartphone, an iPod®, etc.), video game consoles (e.g., Xbox®, PlayStation® 3, etc.), tablet computers (e.g., an iPad®, a Motorola™ Xoom™, etc.), digital media players (e.g., a Roku® media player, a Slingbox®, a Tivo®, etc.), etc. In some examples, identifications of media presentation devices used in consumer locations (e.g., homes, offices, etc.) are aggregated to determine ownership and/or usage statistics of available media presentation devices, relative rankings of usage and/or ownership of media presentation devices, type(s) of uses of media presentation devices (e.g., whether a device is used for browsing the Internet, streaming media from the Internet, etc.), and/or other type(s) of media presentation device information.

In some disclosed examples, a media presentation device includes a network interface to transmit a request for media to be presented by the media presentation device. In such examples, the media presentation device requests content from a content provider via a connected network (e.g., the Internet). In some examples, the request for content is a HyperText Transfer Protocol (HTTP) request, a Session Initiation Protocol (SIP) message, a domain name service (DNS) query, a file transfer protocol (FTP) request, and/or any other type(s) of request for content.

Some networks utilize Internet Protocol (IP) for communication. Two schemes used to address network resources in IP networks are: IP addresses and domain names.

The IP address scheme utilizes IP addresses assigned to network devices. For example, a network device might be assigned an IP version 4 (IPv4) address of 192.168.0.2. Any other past, present, and or future addressing scheme may additionally or alternatively be used (e.g., IPV6). In some examples, more than one IP address might be associated with a network device. For example, at a first time, the network device might be identified by an IP address of 192.168.0.2, while at a second time, the network device might be identified by a different IP address of 192.168.0.3.

Internet Service Providers (ISPs) typically provide a single public IP address for each media exposure measurement location (e.g., a media presentation location, a panelist household, an internet café, an office, etc.) receiving Internet services. In some examples, multiple devices (e.g., media presentation devices) are communicatively coupled by a local area network (LAN) at a media exposure measurement location. In some examples, the LAN includes a router and/or gateway that accesses another network (e.g., the Internet) using a public IP address associated with the media exposure measurement location.

Within the LAN, individual media presentation devices are given private IP addresses in accordance with, for example, a dynamic host control protocol (DHCP). When a media presentation device within the LAN transmits a request to a resource outside of the LAN (e.g., on the Internet,) the router and/or gateway translates the originating (i.e., private) IP address of the device making the query to the public address of the router and/or gateway before relaying the request outside of the LAN (e.g., to the Internet). Thus, when a resource outside of the LAN receives the request, the resource is able to transmit a return message (e.g., a response) to the LAN. On the return path, the router and/or gateway translates the destination IP address of the response to the private IP address of the requesting device so that the return message may be delivered to the media presentation device that made the original request.

The second addressing scheme utilizes domain names. Domain names are human readable identifiers that identify a network resource. Example domain names include "Amazon.com", "Google.com", "Nielsen.com", "HFZLaw.com", etc. While an IP address of a network resource might change over time, the domain name typically remains the same. Domain names typically remain the same because they are purchased by the content provider as a way for users to easily identify the service provided by the service provider. As the IP address of the content provider changes (e.g., because the content provider is now hosting their service via a different server, etc.), the domain name is updated to be associated with the most recent IP address.

Domain names are accessible via a domain name service (DNS) server. The DNS server includes records that, for example, identify a current IP address associated with a domain name of interest. DNS servers providing DNS services provide for translation between domain names and IP addresses and vice-versa. For example, a domain name of "mysite.com" may translate to an IP address of "38.76.48.143", a domain name of "subdomain1.mysite.com" may translate to "38.76.48.144", and a domain name of "subdomain2.mysite.com" may translate to "43.47.167.134". To access a network resource via a domain name, a network device first requests an IP address associated with the domain name of the network resource from a DNS server. Such a request is sometimes referred to as a DNS query or a DNS lookup. The DNS server provides a response to the DNS query and/or DNS lookup indicating the IP address associated with the requested domain name. The network device can then send a content request via the Internet to the network resource at the received IP address.

In accordance with the teachings of this disclosure, one or more DNS servers are used to track DNS queries and/or the devices making such queries. DNS queries are indicative of the identified media presentation devices requesting media content from a content provider because requests for media content are typically preceded by a DNS query. Therefore, DNS queries may be of interest to a media monitoring company. In some examples, a DNS server stores records of what domain names were queried and the originator of the DNS query. Thus, DNS queries from a particular household for a server and/or resource of a content provider may be indicative of media presentations associated with the corresponding content provider in the particular household.

While a given media exposure measurement location can be identified by the public IP address assigned by the ISP and identified in a DNS query (e.g., via a DNS lookup), individual devices within the media exposure measurement location cannot be identified as easily. In some examples disclosed herein, to identify media presentation devices within the media exposure measurement location, the media presentation devices are each assigned to separate DNS servers. Thus, although requests for content and/or DNS lookups are made from the household using the same public IP address, DNS lookup queries for a first device in the LAN/household are directed to a first DNS server while DNS queries for a second device in the LAN/household are directed to a second, different DNS server. Although both DNS lookups are performed using the same public IP address, the different DNS servers addressed inherently identify which of the devices in the LAN/household are responsible for the DNS query. Thus, in some examples disclosed herein, multiple DNS servers are used to associate content requests with different devices within the media exposure measurement location. In some examples, one DNS server is provided per media presentation device within the media exposure measurement location. Thus, each media presentation device within the media exposure measurement location is associated with a respective different DNS server.

For example, a first device (e.g., an Internet enabled television) is assigned to a first DNS server. The association may be done, for example, by the respective gateway of the LAN which is programmed to send DNS queries from the first device within the LAN to the first DNS server, and DNS queries from a second device to a second DNS server, etc. Additionally or alternatively, the association may be done by the respective gateway of the LAN when DNS settings are communicated to each media presentation device (e.g., during a DHCP procedure). Because the DNS server (or a device analyzing logs of the DNS server) knows that DNS queries from the (public) IP address of the monitored LAN originate with a particular device (e.g., the first device) within the LAN, when the first device transmits a DNS query to the first DNS server, the first DNS server (or the device analyzing the logs of the first DNS server) is able to associate the DNS query with the media exposure measurement location via the public IP address, as well as associate the DNS query with the first device via the media presentation device to DNS server association.

Some example methods, apparatus, and/or articles of manufacture disclosed herein are employed at a media exposure measurement location having multiple media presentation devices. Some of these example methods, apparatus, and/or articles of manufacture are employed at a location interposed between the media presentation devices and a wide area network (WAN), such as the Internet, that includes one or more content providers that provide media content in response to request(s) from the media presentation devices. Some example methods, apparatus, and/or articles of manufacture disclosed herein intercept and/or record outgoing messages to the WAN (e.g., media requests from media presentation devices on the same LAN as the intercepting method, apparatus, or article of manufacture).

FIG. 1 is a block diagram of an example system 100 to identify media presentation devices in a local area network (LAN) communicating with a wide area network (WAN) (e.g., the Internet) 125 via a same public IP address. Further shown are an example media exposure measurement location 140, example Internet content providers 130, an example network gateway 145, and example media presentation devices 150, 155, and 160.

The network activity measurement system 110 of the illustrated example is a server that collects and processes DNS queries from the media presentation devices 150, 155, and 160 (e.g., via the gateway 145) to generate media presentation device information. The network activity measurement system 110 analyzes the DNS queries to identify, for example, which media presentation devices are the most owned, the most-frequently used, the least-frequently owned, the least-frequently used, and/or any other media statistics or information that may be determined from the data. In some examples, the network activity measurement system 110 analyzes the DNS queries to identify the most/least-frequently used type(s) of media presentation devices for particular type(s) and/or genre(s) of media content. The media presentation device information may also be correlated or processed with factors such as demographic and/or geodemographic data (e.g., a geographic location of the media exposure measurement location, age(s) of the panelist(s) associated with the media exposure measurement location, an income level of a panelist, etc.) to facilitate extrapolation and/or projection to population(s) of interest. Media presentation device information may be useful to manufacturers and/or advertisers to determine which features should be improved, determine which features are popular among users, identify geodemographic trends with respect to media presentation devices, identify market opportunities, develop and/or create advertisements and/or advertisement campaigns, determine amounts to be paid for advertisements, and/or otherwise evaluate their own and/or their competitors' products and/or marketing efforts.

The network activity measurement system 110 of the illustrated example includes query processor(s) 115. In some examples, each media presentation device 150, 155, and/or 160 within a particular media exposure measurement location (e.g., the location 140) is associated with a respective different query processor 115. Thus, when a given query processor 115 receives a DNS query from a public IP address of the particular media exposure measurement location, the network activity measurement system 110 is able to independently identify the media device that originated the query based on an identifier (e.g., a public IP address) of the media exposure measurement location (e.g., the location 140) because all requests from the given public IP address come from a certain media presentation device.

Each query processor 115 of the illustrated example of FIG. 1 implements or is implemented at or otherwise associated with a respective DNS server. Each query processor 115 receives DNS queries from the same public IP address of the monitored location (e.g., the location 140). In some examples, each query processor 115 responds to a DNS query with the requested DNS information in the same manner as a conventional DNS server. In other examples, the query processor 115 does not actually return the requested DNS information in response to a DNS query, but instead responds to the DNS query with a redirect message, to redirect the querying device (e.g., a media presentation device) to a different DNS server. In some such examples, the query processor may not be implemented by and/or implement a conventional DNS server, but instead may be thought of as a pseudo-DNS server whose function is to log DNS queries and to redirect such queries to a conventional DNS server for service, but which does not actively contain any domain name to IP address lookup table.

In examples where more than one query processor(s) 115 are used, the query processor(s) 115 are identified by different IP addresses. For example, a first query processor 115 might have a first IP address, while a second query processor 115 might have a second IP address different from the first IP address. Thus, when respective media devices (e.g., media presentation devices) are associated with respective ones of the query processors 115, a first media device may be associated with, and should make DNS queries to, the first IP address (e.g., to the first query processor) while a second media device may be associated with, and should make DNS queries to, the second IP address (e.g., to the second query processor).

The network 125 of the illustrated example of FIG. 1 is a wide area network (WAN) such as the Internet. However, in some examples, local networks may additionally or alternatively be used. For example, multiple networks may be utilized to couple the components of the example system 100 to identify media presentation devices.

The example media devices 150, 155, and 160 of FIG. 1 are devices that retrieve content from the Internet content providers 130 for presentation at the media exposure measurement location 140. In some examples, the media devices 150, 155, and 160 are capable of directly presenting media (e.g., via a display) while, in some other examples, the media devices 150, 155 and 160 present the media on separate media presentation equipment (e.g., speakers, a display, etc.). Thus, as used herein "media presentation devices" may or may not be able to present media without assistance from a second device. Media presentation devices are typically consumer electronics. For example, the media presentation device 150 of the illustrated example is an Internet enabled television, and thus, is capable of directly presenting media (e.g., via an integrated display and speakers). The media presentation device 155 of the illustrated example is a gaming console (e.g., Xbox®, PlayStation® 3, etc.) and employs additional media presentation equipment (e.g., a television) to present media. The media presentation device 160 of the illustrated example is a personal computer (e.g., a tablet, a notebook computer, a desktop computer, etc.) and presents media via an associated display device which may or may not be integral to the computer. While in the illustrated example, an Internet enabled television, a gaming console, and a personal computer are shown, any other type(s) and/or number(s) of media presentation device(s) may additionally or alternatively be used. For example, Internet-enabled mobile handsets (e.g., a smartphone, an iPod®, etc.), video game consoles (e.g., Xbox®, PlayStation® 3, etc.), tablet computers (e.g., an iPad®, a Motorola™ Xoom™, etc.) digital media players (e.g., a Roku® media player, a Slingbox®, a Tivo®, etc.), etc. may additionally or alternatively be used. Thus, while in the illustrated example three media presentation devices are shown, any number of media presentation devices may be used.

The Internet content providers 130 of the illustrated example of FIG. 1 are servers providing Internet content (e.g., web pages, videos, images, etc.). The Internet content providers 130 may be implemented by any provider(s) of media content such as a digital content broadcast (e.g., multicast or unicast) provider (e.g., a cable television service, a fiber-optic television service, etc.) and/or an on-demand digital content provider (e.g., an Internet streaming video and/or audio services such as Netflix®, YouTube®, Hulu®, Pandora®, Last.fm®, etc.), a web page, and/or any other provider of media services. Additionally or alternatively, the content providers 130 may not be on the Internet. For example, the content providers may be on a private, a virtual private, and/or semi-private network (e.g., a LAN).

The media exposure measurement location 140 of the illustrated example of FIG. 1 is a panelist household. However, the media exposure measurement location 140 may be any other location, such as, for example an internet café, an office, an airport, a library, a non-panelist home, etc. While in the illustrated example a single media exposure measurement location 140 is shown, any number and/or type(s) of media exposure measurement locations may additionally or alternatively be used.

The example network gateway 145 of the illustrated example of FIG. 1 is a router that enables the media presentation devices 150, 155, and 160 to communicate with the network 125 (e.g., the Internet). In some examples, the network gateway 145 includes gateway functionality such as modem capabilities. In some other examples, the example network gateway 145 is implemented in two or more devices (e.g., a router, a modem, a switch, a firewall, etc.).

In some examples, the example network gateway 145 hosts a LAN for the media exposure measurement location 140. In the illustrated example, the LAN is a wireless local area network (WLAN), and allows the media presentation devices 150, 155, and 160 to transmit and receive data to and/or from the Internet. Alternatively, the network gateway 145 may be coupled to such a LAN.

Figure 2:
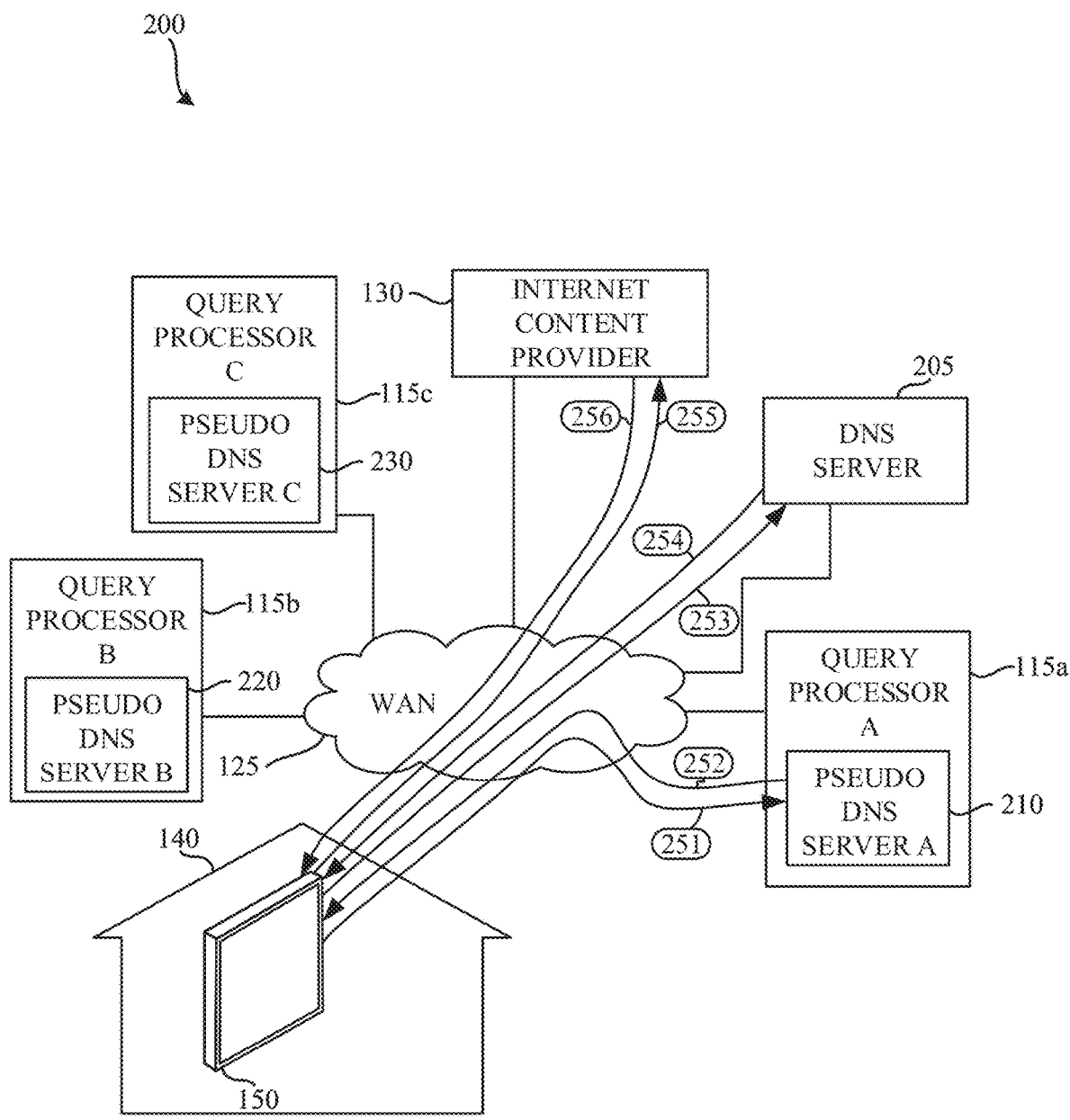
FIG. 2 is a block diagram of an example implementation the example system of FIG. 1 including pseudo-DNS servers.

FIG. 2 is a block diagram of an example implementation 200 of the system 100 of FIG. 1 including three query processors 115a, 115b, and 115c. Each query processor 115a, 115b, and 115c implements or is implemented by a pseudo-DNS server 210, 220, and 230. In the illustrated example, the pseudo-DNS servers 210, 220, and 230 are not true DNS servers because they do not include domain name to IP address translation capabilities. Instead, their function is to log DNS queries and to thereafter redirect such queries to a conventional DNS server 205 for service (e.g., domain name to IP address translation). As mentioned, the pseudo-DNS servers 210, 220, and 230 do not store DNS lookup tables for converting DNS queries into DNS response messages. In the illustrated example, the query processors 115a, 115b, and 115c receive DNS query(ies) from media presentation device(s) (e.g., the media presentation device 150 at the media presentation location 140) and reply with a redirect message(s) redirecting the media presentation device 150 to retrieve the requested DNS information from a DNS server (e.g., the DNS server 205).

In some examples, the media presentation device 150, not knowing an address of an Internet content provider 130, transmits a DNS query to pseudo-DNS server A 210 of the query processor 115a (arrow 251). The query processor A 115a logs the DNS query and, having no translation functionality (e.g., no DNS lookup table), transmits a DNS redirect message to the media presentation device 150 (arrow 252). The DNS redirect message indicates that the media presentation device 150 must contact the DNS server 205 for the requested DNS information. The media presentation device 150 responds by automatically transmitting a second DNS request to the DNS server 205 (arrow 253). The DNS server 205 transmits a DNS response message including the requested DNS information to the media presentation device 150 (arrow 254). The media presentation device 150 then has knowledge of the address of the Internet content provider 130 and can send a content request to the Internet content provider 130 (arrow 255). The Internet content provider 130 then receives the request and provides a response to the media presentation device 150 (arrow 256).

In additional or alternative examples, the query processor(s) 115a, 115b, and 115c implement or are implemented by DNS proxies and process the DNS query(ies) by requesting the information from the DNS server 205 and returning the same to the requesting device. If, for example, the query processor(s) 115a, 115b, and 115c receive a response from the DNS server 205, the response is relayed to the requesting device (e.g., the media presentation device 150). If the query processor(s) 115a, 115b, and 115c do not receive a response from the DNS server 205 a redirect message may be transmitted to the requesting device.

In some examples, the query processor(s) 115a, 115b, and 115c implemented or are implemented by conventional DNS server(s). As conventional DNS servers, the query processor(s) 115a, 115b, and 115c include a lookup table for resolving domain names into IP addresses. When a request is received for a domain name not in the lookup table, the query processor(s) 115a, 115b, and 115c (as a conventional DNS server) performs a DNS lookup at another DNS server to identify the requested IP address.

In other examples, the query processor(s) 115a, 115b, and 115c sends a message other than a redirect message to the requesting device (e.g., the media presentation device 150). For example, a DNS lookup failure message may be transmitted. In some examples, the media presentation device 150 may be configured and/or programmed with multiple DNS servers such as, for example, a primary DNS server address, a secondary and/or an alternate DNS server address, etc. When a lookup failure occurs via a primary DNS server address (e.g., as indicated by receiving a DNS lookup failure message, a timeout, etc.), the media presentation device 150 requests the DNS information via the secondary and/or alternate DNS server address(es). In some examples, the secondary and/or alternative DNS server address(es) are user and/or panelist configurable and/or programmable and may allow the user and/or panelist to specify a DNS server address (e.g., a DNS server suggested by the user and/or panelist's Internet service provider (ISP), a DNS server within the LAN of the media presentation device 150, etc.).

FIG. 3 is a table 300 showing an example association of media presentation devices 150, 155, and/or 160 shown in the examples of FIGS. 1 and/or 2 with the respective query processor(s) 115a, 115b, and 115c shown in the examples of FIGS. 1 and/or 2. The example table 300 includes columns for associating panelists, media presentation devices, and query processors. In some examples, the panelists are identified by and/or otherwise associated with a public IP address. In other examples, panelists are identified by names and/or other identifiers that map the panelist to their demographic characteristics. In the illustrated example, the panelist column represents households having respectively distinct public IP addresses.

In the illustrated example of FIG. 3, two panelists 305, 310 are shown as being associated with media presentation devices 320, 325, 330, 335, and 350 and DNS query processors 322, 327, 332 and 337. The first panelist 305 is identified as being associated with four media presentation devices 320, 325, 330, and 335. In the illustrated example, the first panelist 305 is associated with an Internet television 320, a personal computer 325, a gaming console 330, and a tablet computer 335. Additionally or alternatively, the first panelist 305 may be associated with any number of media presentation devices. The second panelist 310 is shown as being associated with a personal media presentation device (e.g., a digital media player 350).

In the illustrated example, the panelist(s) and/or the respective media presentation device(s) are further associated with respective query processor(s) 115 of the network activity measurement system 110 shown in FIG. 1. Each query processor 115 is separately identified by a unique public Internet protocol (IP) address. In the illustrated example, the Internet television 320 is associated with a query processor at a first IP address 322; the personal computer 325 is associated with a query processor at a second IP address 327; the gaming console 330 is associated with a query processor at a third IP address 332; and the tablet computer 335 is associated with a query processor at a fourth IP address 337. Each media presentation device associated with a same public IP address (e.g., a same household) transmits DNS queries to a respective different query processor 115 (e.g., a pseudo-DNS server, a conventional DNS server, etc.). Thus, each media presentation device can be identified based on which query processor 115 received the DNS query and the public IP address from which the query was received.

In the illustrated example, the digital media player 350 of the second panelist 310 is associated with the first IP address 322. As shown in the illustrated example, multiple media presentation devices may be associated with a same query processor (e.g., the first IP address 322) as long as each media presentation device is located at a different public IP address. When the query processor receives a DNS request, the query processor identifies an originating IP address of the request. However, because only one media presentation device from a given public IP address corresponds with the query processor, the query processor is able to identify both the panelist and the media presentation device. As a result, requests corresponding to the Internet television 320 of the first panelist 305 (associated with the query processor at the first public IP address 322) can be distinguished from requests corresponding to the digital media player 350 of the second panelist 310 (also associated with the query processor at the first public IP address 322).

It is often the case that more than one panelist is located at a monitored household. The table of FIG. 3 cannot distinguish between two individuals who use the same device. Instead the table of FIG. 3 is used to identify a specific media device requesting content, but not for distinguishing between two or more persons that may use that device. Other techniques can be employed to identify current user(s) of the device (e.g., the audience member for the Internet television 320 may include two or more people viewing content simultaneously).

In some examples, the devices within the monitored household are personal electronic devices (e.g., an iPod, a smartphone, etc.) and are more closely associated with a one panelist. Thus, in some examples, it is possible to distinguish between panelists at the same monitored household (e.g., a first person is associated with a first device and a second person is associated with a second device) because the devices are associated with different query processors.

Figure 4:
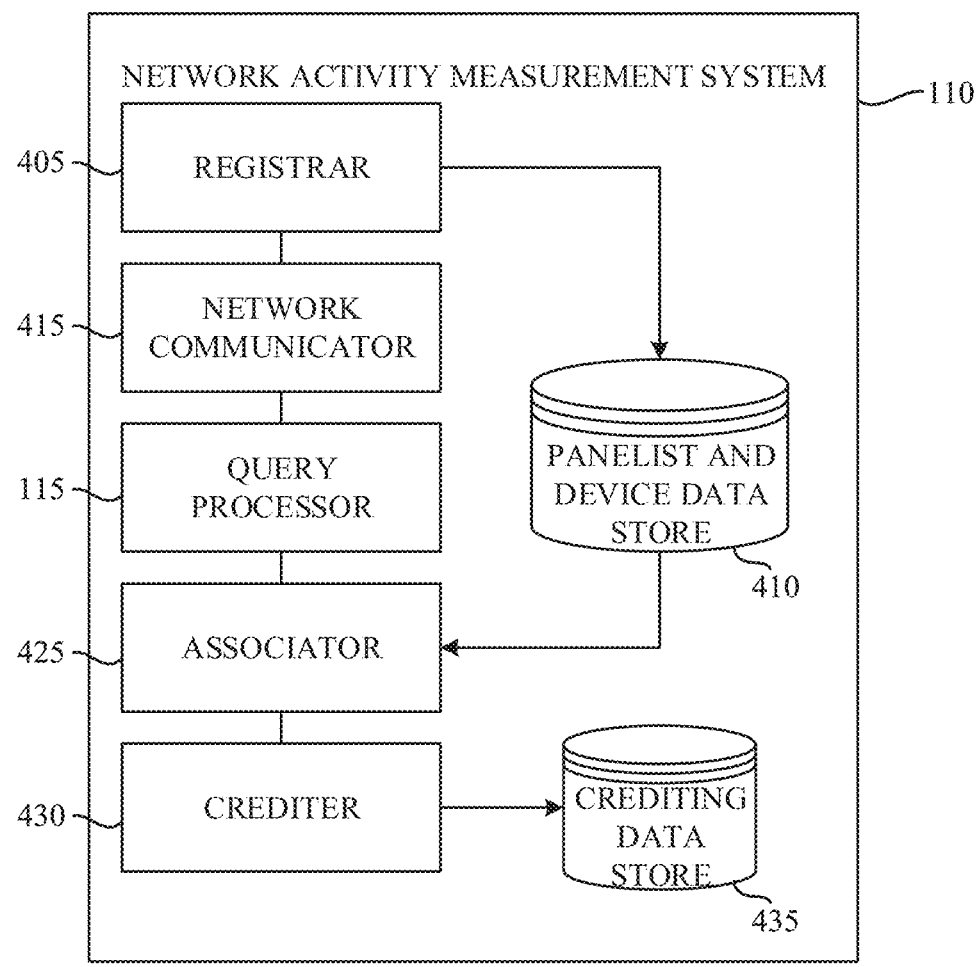
FIG. 4 is a block diagram of an example implementation of the example network activity measurement system of FIG. 1.

FIG. 4 is a block diagram of an example network activity measurement system 110 to implement the network activity measurement system 110 of FIG. 1. The example network activity measurement system 110 of FIG. 4 includes a registrar 405, a network communicator 415, a query processor 115, a panelist and device data store 410, an associator 425, a crediter 430, and a crediting data store 435.

The registrar 405 of the illustrated example of FIG. 4 is implemented by a processor executing instructions, but it could alternatively be implemented by an application specific integrated circuit(s) (ASIC(s)), programmable logic device(s) (PLD(s)) and/or field programmable logic device(s) (FPLD(s)), or other circuitry. In the example of FIG. 4, the registrar 405 receives registration data and/or information from a panelist and stores a record identifying the panelist and/or their respective media presentation devices 150, 155, and/or 160. The registration data is then stored in the panelist device and data store 410. In the illustrated example, the received registration data includes demographic information. However, any other information may additionally or alternatively be collected. The registration data may include, for example, information identifying the model of media presentation device(s) associated with the panelist, a physical mailing address associated with the panelist, an email address associated with the panelist, information regarding how the panelist receives Internet services (e.g., Internet Service Provider (ISP) information), a unique identifier of the panelist (e.g., a public IP address associated with the panelist and/or any combination or derivation of any information related to the panelist and/or media presentation device(s)), the age of the panelist, the gender of the panelist, the race of the panelist, the marital status of the panelist, the income of the panelist and/or the household of the panelist, the employment status of the panelist, where the panelist typically intends to use their media presentation device(s), how long the panelist has owned their device(s), the education level of the panelist and/or any other information related to the panelist or the media presentation device (s). The data store 410 will reflect any relationships between panelists such as, for example, which panelists belong to the same household.

In the illustrated example, the registration data is received by the registrar 405 via an electronic interface (e.g., by a panelist entering data into a form at a website or answering survey questions at a website). However, the registrar 405 may receive the registration data in other ways. For example, the registrar 405 may receive the registration data via a personal interview (by telephone and/or in person), an automated telephone interface, direct mailing, purchased lists, etc. While the registrar 405 of the illustrated example is an electronic system, the registrar 405 may alternatively be implemented manually by a person or group of people collecting and/or entering the registration data into the panelist device and data store 410.

Upon receiving the registration data, the registrar 405 of the illustrated example creates a record associating the panelist, the media presentation device(s) associated with the panelist, and the collected demographic information. The registrar 405 of the illustrated example also assigns a unique alphanumeric identifier to the panelist or media presentation device(s). The identifier may be based on, for example, a model number and/or type of the media presentation device. The record is stored in the panelist device and data store 410. In the illustrated example, the registrar 405 determines a public IP address associated with the panelist and/or media exposure measurement location and stores the public IP address in the record (or in association with the record for that panelist and/or media exposure measurement location.) In some examples, the registrar 405 determines the public IP address associated with the panelist and/or media exposure measurement location by performing a DNS lookup. Additionally or alternatively, the registrar 405 might determine the public IP address associated with the panelist and/or media exposure measurement location by inspecting an IP address field of the registration data when the registration data is submitted electronically.

In some examples, when an ISP assigns a public IP address to a media exposure measurement location, the public IP address is a dynamic IP address. Dynamic IP addresses are typically leased to media exposure measurement locations for a specified period of time (e.g., one week). Upon expiration of the specified period of time, a different public IP address may be assigned to the media exposure measurement location. Thus, the registrar 405 may receive a public IP address associated with the media exposure measurement location that becomes invalid or assigned to a different media exposure measurement location upon expiration of the IP address lease. Accordingly, in some examples, a dynamic DNS system is used to associate a media exposure measurement location with a dynamic IP address. When the public IP address of the media exposure measurement location changes, a device on the LAN (e.g., the network gateway 145, the media presentation devices 150, 155, and/or 160, etc.) updates a dynamic DNS record hosted by a dynamic DNS service to associate a dynamic DNS domain name with the newly leased public IP address. In some examples, the registrar 305 monitors the dynamic DNS domain name at the dynamic DNS service to determine if the public IP address associated with the media exposure measurement location has changed and, upon detecting a change, updates the records stored in the panelist and device data store 410. In some examples, the registrar 405 monitors the dynamic DNS service to determine the domain name associated with a public IP address via, for example, a reverse domain name service query. In some examples, the registrar 305 hosts the dynamic DNS service and updates the records stored in the panelist and device data store 410 upon receiving a notification from a device on the LAN (e.g., the network gateway 145, the media presentation devices 150, 155, and/or 160, etc.) that the public IP address associated with the media exposure measurement location has changed.

In some examples, the registrar 405 associates the media presentation devices 150, 155, and/or 160 with a corresponding query processor 115. As described in association with FIG. 3, each media presentation device sharing a public IP addresses is associated with a different query processor 115. However, media presentation devices from different media exposure measurement locations (i.e., having different public IP addresses) may be associated with the same query processor 115. Thus when associating the media presentation devices 150, 155, and/or 160 with a specific query processor 115, the registrar 405 of the illustrated example balances the number of media presentation devices associated with various query processors 115. For example, if a particular query processor 115 is associated with a large number of media presentation devices (e.g., ten thousand devices), the registrar 405 may associate the media presentation device with another, different, query processor 115 that is presently associated with fewer media presentation devices.

In the illustrated example, after the registrar 405 has received registration data and associated the media presentation devices 150, 155, and/or 160 with the corresponding query processors 115, the registrar 405 creates an instruction document. The instruction document of the illustrated example instructs the panelist to enter information regarding the DNS server association into the media presentation device(s) 150, 155, and/or 160 associated with the panelist and/or the media exposure measurement location 140. Additionally or alternatively, the instruction document may instruct an installer from a media monitoring company or anyone else who may configure and/or program the media presentation device(s) 150, 155, and/or 160.

In the illustrated example, the instruction document is electronically transmitted to the panelist. For example, the instruction document may be transmitted to an email address associated with the panelist. However, in some examples, the instruction document is physically sent to the panelist (e.g., by mailing a printed form of the instruction document through a postal service such as the U.S. mail, etc.).

The panelist and device data store 410 of the illustrated example of FIG. 4 may be implemented by any device for storing data such as, for example, flash memory, magnetic media, optical media, etc. Furthermore, the data stored in the panelist and device data store 410 may be in any data format such as, for example, binary data, comma delimited data, tab delimited data, structured query language (SQL) structures, etc. While in the illustrated example the panelist and device data store 410 is illustrated as a single database, the panelist and device data store 410 may be implemented by any number and/or type(s) of databases.

The network communicator 415 of the illustrated example of FIG. 4 is an Ethernet interface. In the illustrated example the network communicator 415 receives network communications (e.g., DNS queries, etc.) and passes the communications on to the appropriate element of the network activity measurement system (e.g., the query processor 115, the registrar 405, etc.). While in the illustrated example, the network communicator 415 is an Ethernet interface, any other type(s) of interface may additionally or alternatively be used. For example, the network communicator 415 might include one or more of a Bluetooth interface, a WiFi interface, a digital subscriber line (DSL) interface, a T1 interface, etc. While in the illustrated example a single network communicator 415 is shown, any number and/or type(s) of network communicators may additionally or alternatively be used. In some examples, the number of network communicators corresponds to (e.g., is proportional to) the number of query processor(s) 115 present.

Each of the query processors 115 of the illustrated example of FIG. 4 is implemented by a processor executing instructions, but they could alternatively be implemented by an ASIC, DSP, FPGA, or other circuitry. The query processors 115, the registrar 405, and/or the panelist device and data store 410 may be implemented by the same physical processor. In the illustrated example, the query processors 115 function as pseudo-DNS server(s) (e.g., a DNS server with no translation functionality), and respond to DNS queries with DNS redirect messages. In some examples, some or all of the query processors 115 implement conventional DNS servers, where the query processors 115 receive DNS queries via the network communicator 415 and respond to the queries with the requested DNS information. In some examples, some or all of the query processors 115 function as DNS proxies and retrieve DNS information from a separate DNS server on behalf of the DNS query originating device. Additionally or alternatively, the query processors 115 may cache and/or store DNS information from the separate DNS server so that DNS information may more quickly be transmitted in response to future received DNS queries.

When multiple query processors 115 are used, the query processor(s) 115 are uniquely identified by different public IP addresses. For example, a first query processor might have a first public IP address, while a second query processor might have a second public IP address. Thus, when media presentation devices are associated with the query processor(s) 115, the instruction document might indicate that a first media presentation device (e.g., the media presentation device 150, etc.) should transmit DNS queries to the first IP address (e.g., to the first query processor) while a second media presentation device should submit DNS queries to the second IP address (e.g., to the second query processor). While in the illustrated example, public IP addresses are associated with the query processors 115, the IP addresses may alternatively be associated with the network communicator 415. Further, in some examples, virtual IP addresses are used thereby enabling multiple query processor(s) 115 to be associated with a single network communicator 415.

The associator 425 of the illustrated example of FIG. 4 is implemented by a processor executing instructions, but it could alternatively be implemented by an ASIC, DSP, FPGA, or other circuitry. The associator 425 may be implemented on the same physical processor as the registrar 405, the panelist device and data store 410, and/or the query processor 115. In the illustrated example, the associator 425 identifies the media exposure measurement location 140 by associating the public IP address of received DNS queries with a record of the public IP address associated with the media exposure measurement location stored in the panelist and device data store 410. In some examples, the associator 425 identifies a DNS query originating device (e.g., a media presentation device) of the DNS query based on the association of the query processor 115 and the media exposure measurement location 140 stored in the panelist and device data store 410. The crediter 430 of the illustrated example of FIG. 4 credits the panelist associated with the media exposure measurement location 140, the media exposure measurement location 140, and/or the media presentation device 150, 155, and/or 160 with an exposure to the content identified in the received DNS query. In the illustrated example, the crediter 430 is implemented by a processor executing instructions, but it could alternatively be implemented by an ASIC, DSP, FPGA, or other circuitry. The crediter 430 may be implemented on the same physical processor as the registrar 405, the panelist device and data store 410, the query processor 115, and/or the associator 425. The crediter 430 of the illustrated example credits the panelist based on a domain name requested in the DNS query. For example, a DNS query for hulu.com is indicative of content from Hulu® being presented on the media presentation device 150, 155, and/or 160. The example crediter 430 stores the crediting information in the crediting data store 435.

The crediting data store 435 of the illustrated example of FIG. 4 may be implemented by any number or type(s) of device(s) for storing data such as, for example, flash memory, magnetic media, optical media, etc. Furthermore, the data stored in the crediting data store 435 may be in any data format such as, for example, binary data, comma delimited data, tab delimited data, structured query language (SQL) structures, etc. While in the illustrated example the crediting data store 435 is illustrated as a single database, the crediting data store 435 may be implemented by any number and/or type(s) of databases.

While an example manner of implementing the network activity measurement system 110 of FIG. 1 has been illustrated in FIG. 4, one or more of the elements, processes and/or devices illustrated in FIG. 4 may be combined, divided, re-arranged, omitted, eliminated and/or implemented in any other way. Further, the example registrar 405, the example panelist and device data store 410, the example network communicator 415, the example query processor 115, the example associator 425, the example crediter 430, the example crediting data store 435, the example network communications data receiver 440 and/or, more generally, the example network activity measurement system 110 may be implemented by hardware, software, firmware and/or any combination of hardware, software and/or firmware. Thus, for example, any of the example registrar 405, the example panelist and device data store 410, the example network communicator 415, the example query processor 115, the example associator 425, the example crediter 430, the example crediting data store 435, the example network communications data receiver 440 and/or, more generally, the example network activity measurement system 110 could be implemented by one or more circuit(s), programmable processor(s), application specific integrated circuit(s) (ASIC(s)), programmable logic device(s) (PLD(s)) and/or field programmable logic device(s) (FPLD(s)), etc.

When any of the apparatus and/or system claims of this patent are read to cover a purely software and/or firmware implementation, at least one of the example registrar 405, the example panelist and device data store 410, the example network communicator 415, the example query processor 115, the example associator 425, the example crediter 430, the example crediting data store 435, and/or the example network communications data receiver 440 of the example network activity measurement system 110 are hereby expressly defined to include a tangible machine-readable medium such as a memory, DVD, CD, Blu-ray, etc. storing the software and/or firmware. Further still, the example network activity measurement system 110 of FIGS. 1 and 4 may include one or more elements, processes and/or devices in addition to, or instead of, those illustrated in FIGS. 1, and/or 4 and/or may include more than one of any or all of the illustrated elements, processes and devices.

Figure 5:
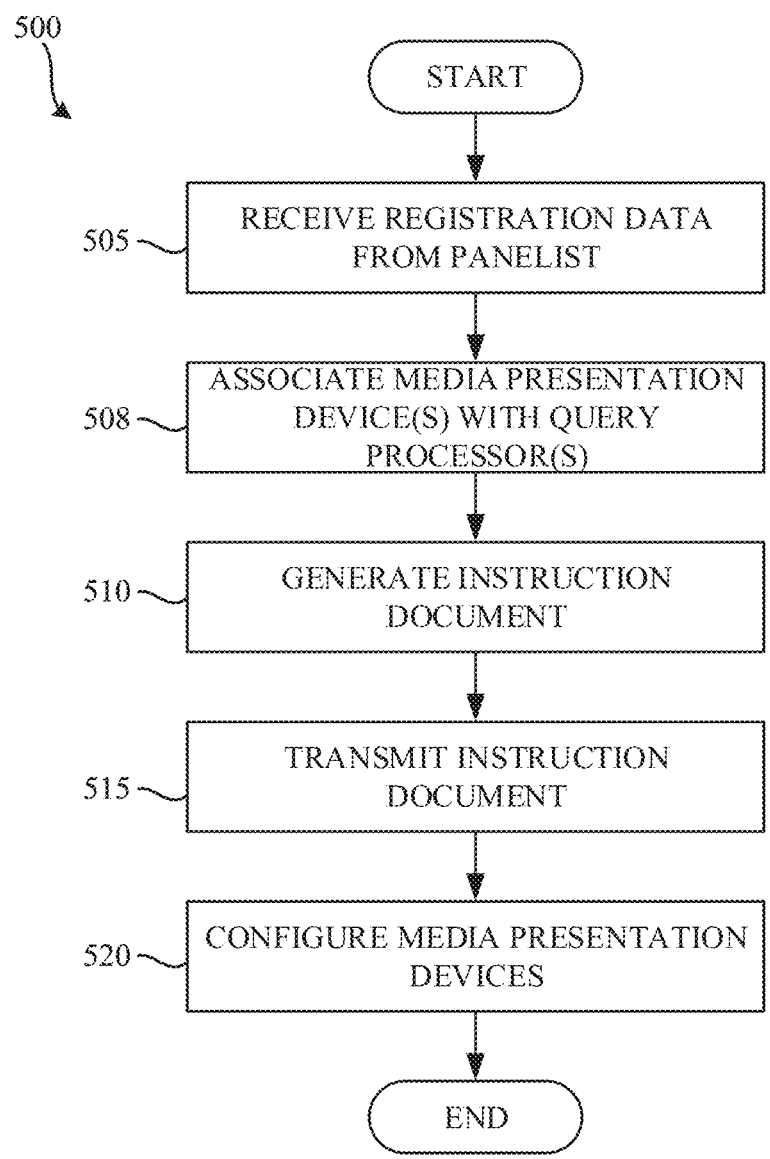
FIG. 5 is a flowchart representative of example machine-readable instructions which may be executed to register a panelist.
Figure 6:
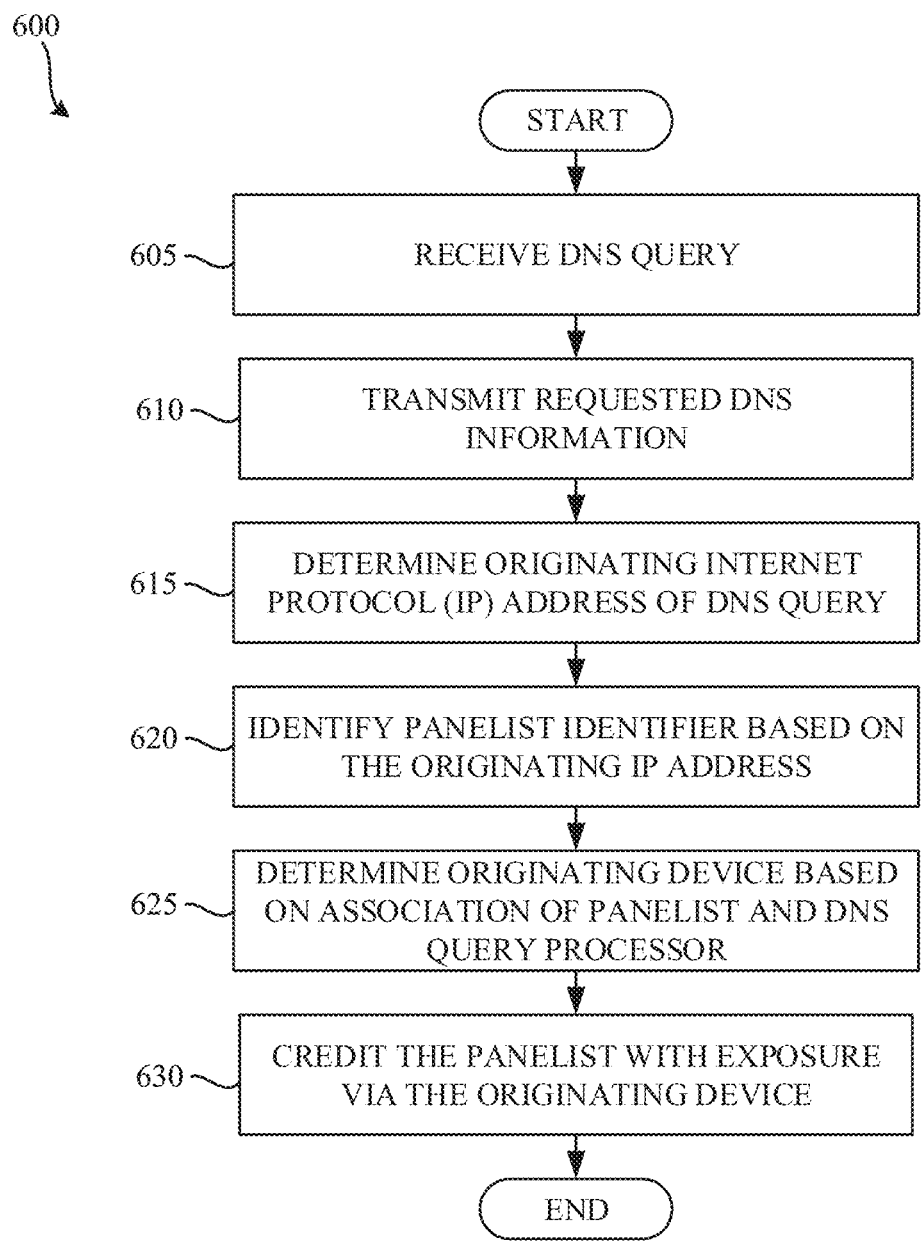
FIG. 6 is a flowchart representative of example machine-readable instructions which may be executed to measure network activity.

Flowcharts representative of example machine-readable instructions for implementing the example network activity measurement system 110 of FIGS. 1 and 4 are shown in FIGS. 5, and 6. In these examples, the machine-readable instructions comprise programs for execution by a processor such as the processor 712 shown in the example processor system 700 discussed below in connection with FIG. 7. The program may be embodied in software stored on a tangible machine-readable medium such as a CD-ROM, a floppy disk, a hard drive, a digital versatile disk (DVD), Blu-ray disk, or a memory associated with the processor 712, but the entire program and/or parts thereof could alternatively be executed by a device other than the processor 712 and/or embodied in firmware or dedicated hardware. Further, although the example programs are described with reference to the flowcharts illustrated in FIGS. 5 and/or 6, many other methods of implementing the example network activity measurement system 110 of FIGS. 1 and 4 may alternatively be used. For example, the order of execution of the blocks may be changed, and/or some of the blocks described may be changed, eliminated, or combined.

As mentioned above, the example processes of FIGS. 5 and/or 6 may be implemented using coded instructions (e.g., machine-readable instructions) stored on a tangible machine-readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible machine-readable medium is expressly defined to include any type of machine-readable storage and to exclude propagating signals. Additionally or alternatively, the example processes of FIGS. 5 and/or 6 may be implemented using coded instructions (e.g., machine-readable instructions) stored on a non-transitory machine-readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory machine-readable medium is expressly defined to include any type of machine-readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 5 is a flowchart representative of example machine-readable instructions 500 which may be executed to implement the example network activity measurement system 110 of FIGS. 1 and 4 to register a panelist.

The machine-readable instructions 500 of FIG. 5 begin execution at block 505 when the registrar 405 receives registration data from a panelist (block 505). In the illustrated example, the registrar 405 receives the registration data via an Internet interface such as, for example, a web page. However, the registrar may receive the registration data via any other method such as, for example a personal interview (by telephone and/or in person), a telephone interface, direct mailing, purchased lists, etc.

In the illustrated example, the registration data includes an identification of media presentation device(s) associated with the panelist to be used in association with the network activity measurement system 110. The registrar 405 associates respective ones of the media presentation device(s) associated with the panelist with respective ones of the query processor 115 (block 508). In the illustrated example, the identification of media presentation devices identifies the type(s) of media presentation device(s) such as, for example, Internet-enabled mobile handsets (e.g., a smartphone, an iPod, etc.), video game consoles (e.g., Xbox®, PlayStation® 3, etc.), Internet-enabled televisions, personal computers, tablet computers (e.g., an iPad®, etc.), digital media players (e.g., a Roku® media player, a Slingbox®, etc.), etc. For example, the panelist might indicate that four media presentation devices will be used (e.g., as in the example shown in FIG. 3). In such an example, the registrar 405 associates the four media presentation devices with four query processors.

Alternatively, the registration data might not include the identification of media presentation devices associated with the panelist. In such an example, the registrar 405 might associate a number of media presentation devices with respective ones of the query processor(s) 115. For example, if most panelists use three media presentation devices, the registrar 405 may associate three media presentation devices with the panelist and allow for the panelist to request associations of additional media presentation devices.

Additionally or alternatively, after having previously associated media presentation device(s) with respective ones of the query processor(s) 115, the registrar 405 may associate additional media presentation devices of the panelist. For example, if the panelist begins using an additional media presentation device, the registrar 405 may be notified of the additional device and may associate the additional device with a respective one of the query processor(s) 115.

After having associated the respective ones of the media presentation device(s) associated with the panelist with respective ones of the query processor(s) 115 (block 508), the registrar 405 generates an instruction document (block 510). The instruction document may instruct the panelist and/or an installer of the associations of the respective ones of the media presentation device(s) with the respective ones of the query processor(s) 115. In some examples, the registrar 405 is informed of the type of device being associated with the query processor 115, and thus, may further indicate how to apply such associations to that particular type of device. In the illustrated example, the instruction document includes DNS server public IP addresses that are to be applied to the media presentation devices. For example, the instruction document may instruct the panelist to navigate to an interface for configuring and/or programming network settings on the media presentation device (i.e., select 'advanced options', select 'network settings', select 'IP settings', select 'DNS settings', enter the DNS server public IP address).

In some examples, the instruction document includes a domain name service server IP address for each media presentation device 150, 155, and/or 160 thereby associating each media presentation device 150, 155, and/or 160 with a respective query processor 115. If the query processor 115 associated with a given media presentation device is unable to respond to DNS queries, the media presentation device will be unable to display the requested media content. Furthermore, it is desirable for monitoring entities to monitor media presentation activity without affecting the manner in which users behave. Causing media presentation failure due to a monitoring technique is inconsistent with that desire. Thus, in some other examples, a second DNS server IP address is provided in the instruction document. If the media presentation device does not receive a response from a DNS server or pseudo-DNS server associated with the first IP address, the media presentation device may re-attempt the DNS query via the second IP address of a second DNS server (or pseudo-DNS server). In some examples, the second DNS server IP address may be associated with a different query processor 115, or may be associated with a DNS server outside of the network activity measurement system 110. Additionally or alternatively, the second DNS server IP address may identify a private DNS server (e.g., a DNS server (e.g., the network gateway 145) located within the media exposure measurement location 140).

After the instruction document is generated by the registrar 405 in block 510, the registrar 405 transmits the instruction document to the panelist and/or installer (block 510). In the illustrated example, the instruction document is provided via an electronic mail (email) message. However, any other methods of transmitting the instruction document may additionally or alternatively be used. For example, the instruction document may be transmitted as an attachment to the email message, the registrar 405 may transmit a short message service (SMS) message comprising a link to or a textural representation of an Internet address where the panelist may retrieve the instruction document, a direct mailing may be sent to the panelist comprising the instruction document and/or additionally comprising an electronic medium containing the instruction document, a telephone call may be placed to orally instruct the panelist on how to configure and/or program the media presentation device(s), etc.

The media presentation device(s) 150, 155, and/or 160 are then configured and/or programmed to transmit DNS queries to the associated query processor(s) 115 (block 520). The media presentation devices may be manually configured and/or programmed by, for example, the panelist, an installer, etc. In some examples, DNS server information is transmitted to the media presentation devices via a dynamic host control protocol (DHCP). For example, the instruction document might be an electronic configuration file for configuring and/or programming a DHCP server on the local area network of the media exposure measurement location 140. In some examples such as, for example, when the media exposure measurement location 140 is a residential location, the DHCP server on the local area network is the network gateway 145. However, the DHCP server may be present on any other network device. When media presentation devices are attached to the network, they are assigned an IP address by the DHCP server. In addition to being assigned an IP address, additional network information such as, for example, a subnet mask, a default gateway, DNS server IP addresses, etc. are transmitted to the media presentation devices by the DHCP server. In some examples, the instruction document is a file that instructs the DHCP server to assign DNS server IP address(es) to the media presentation devices based on the media presentation device to DNS server associations made by the registrar 405.

FIG. 6 is a flowchart representative of example machine-readable instructions 600 which may be executed to implement the example network activity measurement system 110 of FIGS. 1 and/or 4 to measure network activity. The machine-readable instructions 600 of FIG. 6 begin execution when the network communicator 415 receives a domain name service query originating from a media presentation device 150, 155, and/or 160 (block 605). The network communicator forwards the DNS query to the query processor 115. In some examples, the query processor 115 is identified by a destination IP address of the DNS query.

The query processor 115 then generates a response to the DNS query by gathering the requested DNS information, and transmits the requested DNS information to the media presentation device 150, 155, and/or 160 via the network communicator 415 (block 610). In the illustrated example, gathering the requested DNS information is implemented by performing a lookup of the requested DNS information in a DNS information table. In some examples, the DNS information table is local to the query processor 115. In some examples, the DNS information table is shared between the one or more query processor(s) 115 of the network activity measurement system 110. In some examples, the DNS information table is at separate DNS server(s).

In the illustrated example, the query processor 115 determines the originating IP address of the DNS query (block 615). Because the registrar 405 enters IP address-to-panelist associations in the panelist and device data store 410, determining the originating public IP address enables the associator 425 to identify a panelist associated with the DNS query (block 620).

The associator 425 then identifies the media presentation device 150, 155, and/or 160 originating the DNS query (block 625). In the illustrated example, the media presentation device 150, 155, and/or 160 is identified based on the panelist associated with the public IP address originating the DNS query and the IP address of the query processor 115 to which the DNS query was sent.

The crediter 430 of the illustrated example then credits the panelist with exposure to the content associated with the domain name identified in the DNS query (block 630). In some examples, the crediter 430 further credits the panelist and/or the media presentation device 150, 155, and/or 160 with exposure to the content associated with the domain name identified in the DNS query in association with the media presentation device 150, 155, and/or 160 that originated the DNS query (e.g., to distinguish content access on, for example, an iPad® or other tablet from content accessed via, for example, an Xbox® and a large screen television). In the illustrated example, the crediter 430 stores the crediting information in the crediting data store 435.

Figure 7:
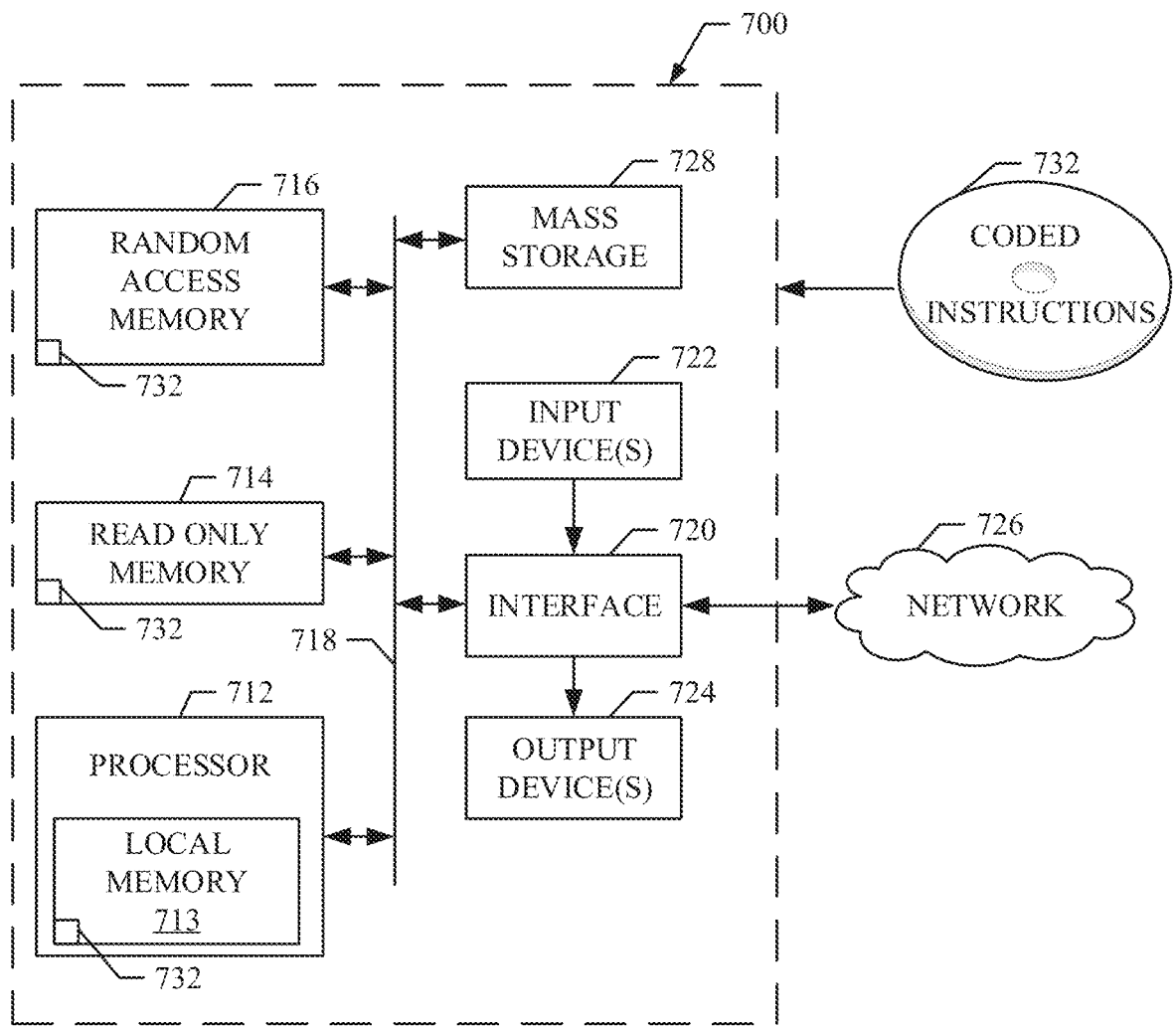
FIG. 7 is a block diagram of an example processor platform capable of executing the example machine-readable instructions of FIGS. 5 and/or 6 to implement the example network activity measurement system of FIGS. 1 and/or 4.

FIG. 7 is a block diagram of an example processor platform 700 capable of executing the example machine-readable instructions of FIGS. 5 and/or 6 to implement the example network activity measurement system of FIGS. 1 and 4. The example processor platform 700 can be, for example, a server, a personal computer, an Internet appliance, a set top box, or any other type of computing device.

The example processor platform 700 of the instant example includes a processor 712. For example, the processor 712 can be implemented by one or more processors, microprocessors, and/or controllers from any desired family or manufacturer.

The processor 712 includes a local memory 713 (e.g., a cache) and is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The example processor platform 700 also includes an interface circuit 720. The interface circuit 720 may be implemented by any type of interface standard, such as an Ethernet interface, a universal serial bus (USB), and/or a PCI express interface.

One or more input devices 722 are connected to the interface circuit 720. The input device(s) 722 permit a user to enter data and commands into the processor 712. The input device(s) 722 can be implemented by, for example, a keyboard, a mouse, a touchscreen, a track-pad, a trackball, isopoint and/or a voice recognition system.

One or more output devices 724 are also connected to the interface circuit 720. The output devices 724 can be implemented, for example, by display devices (e.g., a liquid crystal display, a cathode ray tube display (CRT), a printer and/or speakers). The interface circuit 720, thus, typically includes a graphics driver card.

The interface circuit 720 also includes a communication device (e.g., the network communicator 415, the network communicator 505, etc.) such as a modem or network interface card to facilitate exchange of data with external computers via a network 726 (e.g., an Ethernet connection, a digital subscriber line (DSL), a telephone line, coaxial cable, a cellular telephone system, etc.).

The example processor platform 700 also includes one or more mass storage devices 730 for storing software and data. Examples of such mass storage devices 730 include floppy disk drives, hard drive disks, compact disk drives and digital versatile disk (DVD) drives. The mass storage device 728 may implement the panelist and device data store 410, the crediting data store 435, and/or the network communications data store 520.

The coded instructions 732 of FIGS. 4 and/or 5 may be stored in the mass storage device 728, in the volatile memory 716, in the non-volatile memory 714, and/or on a removable storage medium such as a CD or DVD.

From the foregoing, it will be appreciated that the above disclosed systems, methods, apparatus and articles of manufacture identify media presentation devices communicating on a network.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus for monitoring network activity comprising:
 an associator to associate a first domain name service query that identifies a domain name, sent from a media presentation device, received at a pseudo DNS server with a media exposure measurement location based on a public Internet Protocol (IP) address of the received first domain name service query, wherein the pseudo DNS server does not provide domain name-to-IP address translation, wherein the pseudo DNS server is to receive the first domain name service query and transmit a redirect message to the media presentation device to cause the media presentation device to send a second domain name service query that identifies the domain name to a further DNS server; and
 a crediter to credit the media exposure measurement location with accessing media identified based on the first domain name service query.

2. The apparatus of claim 1, further including a registrar to associate the public IP address with the media exposure measurement location based on registration data from a panelist.

3. The apparatus of claim 2, wherein the registrar is to associate the public IP address with demographic information of the panelist.

4. The apparatus of claim 2, wherein the registrar is to receive the registration data via an electronic interface, the electronic interface conveying the public IP address of the media exposure measurement location.

5. The apparatus of claim 2, wherein the registration data includes an identification of a device at the media exposure measurement location.

6. The apparatus of claim 1, wherein the first domain name service query includes at least one of a name, an acronym, an abbreviation, or a title associated with a media content provider.

7. The apparatus of claim 1, wherein the further DNS server is to perform domain name-to-IP address translation, the further DNS server to provide a DNS response associated with an address of Internet media content.

8. A non-transitory computer readable storage medium comprising instructions which, when executed, cause a machine to at least:
 associate a first domain name service query that identifies a domain name, sent from a media presentation device, received at a pseudo DNS server with a media exposure measurement location based on a public Internet Protocol address of the received first domain name service query, wherein the pseudo DNS server does not provide domain name-to-IP address translation, wherein the pseudo DNS server is to receive the first domain name service query and transmit a redirect message to the media presentation device to cause the media presentation device to send a second domain name service query that identifies the domain name to a further DNS server; and
 credit the media exposure measurement location with accessing media identified based on the first domain name service query.

9. The non-transitory computer readable storage medium of claim 8, wherein the instructions, when executed, further cause the machine to associate the public IP address with the media exposure measurement location based on registration data from a panelist.

10. The non-transitory computer readable storage medium of claim 9, wherein the instructions, when executed, further cause the machine to associate the public IP address with demographic information of the panelist.

11. The non-transitory computer readable storage medium of claim 9, wherein the instructions, when executed, further cause the machine to receive the registration data via an electronic interface, the electronic interface conveying the public IP address of the media exposure measurement location.

12. The non-transitory computer readable storage medium of claim 9, wherein the registration data includes an identification of a device at the media exposure measurement location.

13. The non-transitory computer readable storage medium of claim 8, wherein the first domain name service query includes at least one of a name, an acronym, an abbreviation, or a title associated with a media content provider.

14. The non-transitory computer readable storage medium of claim 8, wherein the further DNS server is to perform domain name-to-IP address translation, the further DNS server to provide a DNS response associated with an address of Internet media content.

15. A method of monitoring network activity, the method comprising:
 associating a first domain name service query that identifies a domain name, sent from a media presentation device, received at a pseudo DNS server with a media exposure measurement location based on a public Internet Protocol address of the received first domain name service query, wherein the pseudo DNS server does not provide domain name-to-IP address translation, wherein the pseudo DNS server is to receive the first domain name service query and transmit a redirect message to the media presentation device to cause the media presentation device to send a second domain name service query that identifies the domain name to a further DNS server; and
 crediting the media exposure measurement location with accessing media identified based on the first domain name service query.

16. The method of claim 15, further including associating the public IP address with the media exposure measurement location based on registration data from a panelist.

17. The method of claim 16, further including associating the public IP address with demographic information of the panelist.

18. The method of claim 16, further including receiving the registration data via an electronic interface, the electronic interface conveying the public IP address of the media exposure measurement location.

19. The method of claim 16, wherein the registration data includes an identification of a device at the media exposure measurement location.

20. The method of claim 15, wherein the first domain name service query includes at least one of a name, an acronym, an abbreviation, or a title associated with a media content provider.

21. The method of claim 15, wherein the further DNS server is to perform domain name-to-IP address translation, the further DNS server to provide a DNS response associated with an address of Internet media content.

22. An apparatus comprising:
 memory;
 instructions; and
 processor circuitry to at least one of execute or instantiate the instructions to:
 associate a first domain name service query that identifies a domain name, sent from a media presentation device, received at a pseudo DNS server with a media exposure measurement location based on a public Internet Protocol address of the received first domain name service query, wherein the pseudo DNS server does not provide domain name-to-IP address translation, wherein the pseudo DNS server is to receive the first domain name service query and transmit a redirect message to the media presentation device to cause the media presentation device to send a second domain name service query that identifies the domain name to a further DNS server; and credit the media exposure measurement location with accessing media identified based on the first domain name service query.

23. The apparatus of claim 22, wherein the processor circuitry is to associate the public IP address with the media exposure measurement location based on registration data from a panelist.

24. The apparatus of claim 23, wherein the processor circuitry is to associate the public IP address with demographic information of the panelist.

25. The apparatus of claim 23, wherein the processor circuitry is to receive the registration data via an electronic interface, the electronic interface conveying the public IP address of the media exposure measurement location.

26. The apparatus of claim 23, wherein the registration data includes an identification of a device at the media exposure measurement location.

27. The apparatus of claim 22, wherein the first domain name service query includes at least one of a name, an acronym, an abbreviation, or a title associated with a media content provider.

28. The apparatus of claim 22, wherein the further DNS server is to perform domain name-to-IP address translation, the further DNS server to provide a DNS response associated with an address of Internet media content.

* * * * *